(12) United States Patent
Fukaya et al.

(10) Patent No.: US 6,544,654 B1
(45) Date of Patent: Apr. 8, 2003

(54) THICK-FILM RESISTOR AND CERAMIC CIRCUIT BOARD

(75) Inventors: Masashi Fukaya, Kuwana (JP); Koji Shibata, Ogaki (JP); Chiaki Higuchi, Ebina (JP); Yoshinobu Watanabe, Hiratsuka (JP)

(73) Assignee: Sumitomo Metal (SMI) Electronics Devices, Inc., Mine (JP)

( * ) Notice: Subject to any disclaimer, the term of this patent is extended or adjusted under 35 U.S.C. 154(b) by 0 days.

(21) Appl. No.: 09/697,150

(22) Filed: Oct. 27, 2000

(30) Foreign Application Priority Data

Oct. 28, 1999 (JP) .............................. 11-306238
May 12, 2000 (JP) .............................. 2000-144565
Jun. 14, 2000 (JP) .............................. 2000-184529

(51) Int. Cl.⁷ .......................... B32B 15/04; C03C 14/00
(52) U.S. Cl. ........................ 428/432; 501/32; 501/65; 428/689
(58) Field of Search .................... 501/32, 65; 428/432, 428/689

(56) References Cited

U.S. PATENT DOCUMENTS 3,499,776 A * 3/1970 Baak et al. .................. 501/65
5,109,238 A * 4/1992 Watanabe et al. ........... 347/202
5,766,741 A * 6/1998 Kawakami et al. ......... 428/210

FOREIGN PATENT DOCUMENTS

GB       1 550 998       8/1979

* cited by examiner

Primary Examiner—Deborah Jones
Assistant Examiner—G. Blackwell-Rudasill
(74) Attorney, Agent, or Firm—Foley & Lardner (57) ABSTRACT

A thick-film resistor contains $RuO_2$ and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %. A ceramic circuit board includes a thick-film resistor printed on it, the thick-film resistor containing $RuO_2$ and an $SiO_2$—$B_2O_3$—$K_2O$ glass having the above composition.

11 Claims, 4 Drawing Sheets

THICK-FILM RESISTOR AND CERAMIC CIRCUIT BOARD

BACKGROUND OF THE INVENTION

1. Field of the Invention

This invention relates to a thick-film resistor containing no lead and a ceramic circuit board.

2. Description of the Prior Art

In forming a resistor on a surface of a ceramic substrate by a thick-film method, a thick-film resistor pattern is conventionally printed using a thick-film resistor paste. The thick-film resistor pattern is then fired to be formed into a thick-film resistor. At present, a mixture of ruthenium oxide and glass is generally used to form a thick-film resistor in order to adjust the firing temperature and resistance value. However, the glass used for the formation of the thick-film resistor contains lead (Pb) for the following reasons:

(1) Electrical resistance of the thick-film resistor is obtained by resistance due to contact of fine powder of an electrically conductive material (ruthenium oxide) and resistance due to a thin film of glass between the conductive materials. However, a quantity of conductive material is reduced when a thick-film resistor to be fabricated has a high resistance at or above 100 kΩ/square. As a result, the resistance due to a thin film of glass between the conductive materials is dominant and accordingly, the resistance value tends to be changed even by a slight variation in a firing step. As a countermeasure, a ruthenium composite oxide such as $Pb_2RU_2O_6$, $Bi_2Ru_2O_7$, etc., each of which has a higher resistivity than $RuO_2$, is used as the conductive material such that a blending ratio of the conductive material is increased, whereupon a rate of electrical conduction by the contact of the conductive materials is increased.

However, the ruthenium composite oxide partially decomposes in the firing step, thereby rendering the characteristic of the thick-film resistor unstable. For example, $Bi_2Ru_2O_7$ decomposes as follows:

$$Bi_2Ru_2O_7 \rightarrow 2RuO_2 + Bi_2O_3$$

The thick-film resistor contains both $RuO_2$ and $Bi_2Ru_2O_7$ as the result of the decomposition. Glass used for the formation of the thick-film resistor needs to contain PbO in order that the aforesaid decomposition may be prevented.

(2) When the glass of the thick-film resistor contains PbO, characteristics of the glass such as a melting point, thermal expansion coefficient, etc. can readily be adjusted and accordingly, the characteristics of the thick-film resistor can readily be adjusted. However, the use of lead is undesirable from the point of view of environmental protection. A thick-film resistor using no lead needs to be developed early.

A compressive force needs to be applied from the ceramic substrate to the thick-film resistor to prevent progress of microcrack in order that the stability of thick-film resistor may be ensured for a long period of time. For this purpose, the thermal expansion coefficient of the thick-film resistor needs to be rendered smaller than that of the ceramic substrate. The ruthenium composite oxide has a thermal expansion coefficient of 8.0 to $10.0 \times 10^{-6}/°C$, which value is rather larger than the thermal expansion coefficient, 4 to $6 \times 10^{-6}/°C$, of the ceramic substrate. Accordingly, $RuO_2$, (5 to $6 \times 10^{-6}/°C$) is desirable as the conductive material for the ceramic substrate. However, since $RuO_2$ has a lower resistivity than the ruthenium composite oxide as described above, the blending ratio of $RuO_2$, needs to be reduced and that of glass needs to be increased when a resistor having the resistance at or above 100 kΩ/square is fabricated from an $RuO_2$ thick-film resistor. As a result, the resistance value tends to be changed even by a slight variation in the firing step.

Furthermore, a glass paste is conventionally printed and fired on the surface of a thick-film resistor or thick-film conductor fabricated on the ceramic substrate so that a film of overcoat glass is fabricated. The surface of the thick-film resistor or thick-film conductor is covered with the overcoat glass for insulation of the thick-film resistor or conductor, whereby the electrical characteristic of the resistor or conductor is stabilized.

Although the conventional overcoat glass contains PbO for adjustment of the characteristics such as a firing temperature, thermal expansion coefficient, etc., the use of lead is undesirable from the point of view of environmental protection. A thick-film resistor using no lead needs to be developed early. In view of this point, the prior art has proposed an unleaded overcoat glass containing no Pb component. However, since the proposed unleaded overcoat glass has a large thermal expansion coefficient, the thermal expansion coefficient of the overcoat glass becomes larger than that of the ceramic substrate when the proposed overcoat glass is used for a ceramic substrate having a low thermal expansion coefficient, whereupon the ceramic substrate applies a tensile force to the overcoat glass.

One of important purposes of the overcoat glass is to limit progress of microcrack caused in the thick-film resistor during laser trimming to thereby reduce the variation of the resistance value with age. The overcoat glass needs to apply a compressive force to the thick-film resistor to fully accomplish the purpose. As described above, however, the ceramic substrate applies the tensile force to the overcoat glass. The tensile force reduces the compressive force applied to the thick-film resistor, whereupon the effect of limiting the progress of microcrack is reduced after the laser trimming and the variations in the resistance value with age are increased.

SUMMARY OF THE INVENTION

Therefore, a primary object of the present invention is to provide a thick-film resistor which is unleaded or contains no lead, which is hard to be influenced by the variations in the firing step, which has a stable resistance value, which can be fabricated efficiently, and which can improve the productivity and quality.

Another object of the invention is to provide a ceramic circuit board which uses an overcoat glass which is unleaded and in which characteristics of the overcoat glass such as the firing temperature, thermal expansion coefficient, etc. can properly be adjusted without use of lead component.

To achieve the primary object, the present invention provides a thick-film resistor comprising $RuO_2$ and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %.

The thick-film resistor is fired at or below 900° C. in most cases and more specifically at about 850° C. The reason for this is that a metal with a low melting point, for example, Ag or Au, is used as a surface conductor of the ceramic substrate. Another reason is for prevention of evaporation of $RuO_2$. In order that the thick-film resistor may be fired at 850° C., it is desired that glass contained in it have a transition point at or below 650° C. In the present invention, the $SiO_2$—$B_2O_3$—$K_2O$ glass contained in the thick-film resistor has the above-described composition such that a transition point thereof is at or below 650° C. As a result, the thick-film resistor can be fired at 850° C. In this case, $K_2O$ contained in the glass serves to lower the glass transition point. Accordingly, when an amount of $K_2O$ is smaller than 0.1 wt %, the glass transition point becomes higher than 650° C., whereupon it is difficult to fire the thick-film resistor at 850° C. $Na_2O$ or $Li_2O$ can lower the glass transition point, instead of $K_2O$. However, when $Na_2O$ or $Li_2O$ is used, a temperature coefficient of resistance (TCR) changes to a large extent to thereby take a negative value. This deteriorates the temperature characteristic of the thick-film resistor. Since $K_2O$ is used in the present invention, the glass transition point can be lowered without deterioration of the temperature characteristic of the thick-film resistor. The thermal expansion coefficient (TEC) of the glass is increased when a quantity of $K_2O$ contained in the glass is excessively increased. Accordingly, it is not preferable to unnecessarily increase a quantity of $K_2O$ to be blended into the glass. The thermal expansion coefficient of the glass is at or below $6.0 \times 10^{-6}/°$ C. when the quantity of $K_2O$ is at or below 10 wt % as in the present invention. Consequently, a thermal expansion coefficient of the thick-film resistor blended with $RuO_2$ having a thermal expansion coefficient of 5 to $6 \times 10^{-6}/°$ C. is at or below $6.0 \times 10^{-6}/°$ C. Accordingly, when the thick-film resistor is fabricated on a ceramic substrate having a low thermal expansion coefficient (4 to $6 \times 10^{-6}/°$ C.), a compressive force or a slight tensile force is applied to the thick-film resistor. Thus, the thick-film resistor is not subjected to a large tensile force. As a result, the change in the resistance value after the laser trimming is small and accordingly, a stable thick-film resistor can be obtained.

In a first preferred form, $RuO_2$ has a specific surface area ranging between 30 and 80 m²/g. An electric charge tends to be concentrated more as an specific surface area of $RuO_2$ is rendered small, whereupon an electrostatic discharge (ESD) characteristic tends to be reduced. According to results of experiments carried out by the inventors, a preferable ESD characteristic can be ensured when the specific surface area of $RuO_2$ is at or above 30 m²/g. However, when the specific surface area exceeds 80 m²/g, an oxidation catalytic action of $RuO_2$ is intensified such that there is a possibility of spontaneous fire of organic substance. Accordingly, the specific surface area of $RuO_2$ is preferably at or below 80 m²/g.

In a second preferred form, $K_2O$ of 0.8 to 4 wt % relative to $RuO_2$ of 100 wt % adheres to a surface of $RuO_2$. $K_2O$ is caused to adhere to the surface of $RuO_2$ in a fabrication step of $RuO_2$. $K_2O$ on the surface of $RuO_2$ improves wettability between the $SiO_2$—$B_2O_3$—$K_2O$ glass and $RuO_2$ and accordingly stabilizes the conduction through glass, so that changes in the resistance value due to the changes of the firing temperature or the firing temperature dependency can be reduced. $K_2O$ on the surface of $RuO_2$ further prevents the concentration of electric charge, improving the ESD characteristic. The above-mentioned effects are small when $K_2O$ on the surface of $RuO_2$ is below 0.8 wt %. Further, when $K_2O$ on the surface of $RuO_2$ exceeds 4 wt %, the temperature coefficient of resistance changes to a large extent to thereby take a negative value. Accordingly, an amount of $K_2O$ adherent to the surface of $RuO_2$ preferably ranges between 0.8 and 4 wt %.

In a third preferred form, the thick-film resistor further comprises additive glass containing a transition metal oxide and $B_2O_3$. Borate containing the transition metal in the additive glass has conductivity by electronic conduction and accordingly a semiconductive property. Accordingly, the additive glass prevents local concentration of electric charge when a surge voltage is applied thereto, thereby preventing breaking of the glass of the thick-film resistor. This characteristic increases the effect of adding the additive glass when a sheet resistance value is large. However, the temperature of coefficient of resistance takes a negative value since the additive glass has the semiconductive property. Thus, in order that both the temperature coefficient of resistance and the ESD characteristic may be satisfied, a quantity of the additive glass preferably ranges between 3 and 15 wt %, for example, when the thick-film resistor has the resistance of 100 kΩ/square.

In a fourth preferred form, the thick-film resistor further comprises 5 wt % or less of a transition metal oxide. When a quantity of the transition metal oxide added to the thick-film resistor is at or below 5 wt %, the quantity is adjusted so that the temperature coefficient of resistance of the thick-film resistor can optionally be adjusted. When the quantity of the transition metal oxide exceeds 5 wt %, there is a possibility that the resistance value is not stable. On the other hand, the thick-film resistor self-heats when electric current flows therethrough, so that the temperature thereof is increased. The thick-film resistor varies its resistance value with changes in the temperature thereof. Accordingly, an amount of change In the resistance value of the thick-film resistor is rendered larger as an amount of increase in the temperature due to generation of heat becomes large, whereupon stable electric characteristics cannot be obtained. Further, when the temperature of the thick-film resistor is increased over the critical heat resistance, crack occurs in the thick-film resistor. In view of both electrical characteristics and heat resistance, it is desired that the heat radiation characteristic be increased so that the increase in the temperature due to heat generation is rendered as small as possible. However, glass used in the thick-film resistor has a small heat conductivity for improvement of the electrical characteristics such as the temperature coefficient of resistance (TCR), ESD, etc. As a result, the heat conductivity and heat radiation of the thick-film resistor are deteriorated. Accordingly, in order that the increase in the temperature due to heat generation may be limited within an allowable range, the maximum power supplied to the thick-film resistor needs to be reduced so that an amount of heat generated by the thick-film resistor is reduced and accordingly, the power resistance (heat resistance) is lowered. Particularly when the thick-film resistor is fabricated on a glass ceramic substrate having a small heat conductivity, the heat radiation of the thick-film resistor is further reduced and the power resistance is further lowered.

In a fifth preferred form, the $SiO_2$—$B_2O_3$—$K_2O$ glass contains 1 to 20 wt % of $ZrO_2$ particle in view of the above-described problem. The $ZrO_2$ particle has a higher heat conductivity than glass and the $ZrO_2$ particle and the $SiO_2$—$B_2O_3$—$K_2O$ glass do not act on each other at the firing temperature of the thick-film resistor (at or below 900° C.). Consequently, when a suitable quantity of $ZrO_2$ is added to the $SiO_2$—$B_2O_3$—$K_2O$ glass, the thermal conductivity of the thick-film resistor can be increased without deterioration of the electrical characteristics of the thick-film resistors. This can increase heat radiation and improve the power resistance. The results of experiments which will be described later show that a proper range of a quantity of the $ZrO_2$ particle to be added is between 1 and 20 wt %.

However, when the $ZrO_2$ particle is non-uniformly distributed in the thick-film resistor, local heat generation occurs in a portion of the thick-film resistor wherein a quantity of the $ZrO_2$ particle is small. A local increase in the temperature lowers the power resistance and accordingly reduces the effect of addition of the $ZrO_2$ particle. The results of experiments carried out by the inventors show that when the $ZrO_2$ particle has a large particle diameter, it is difficult to uniformly distribute the $ZrO_2$ particle over the thick-film resistor, whereupon the effect of addition of the $ZrO_2$ particle is reduced.

In a sixth preferred form, the $ZrO_2$ particle has a mean particle diameter (D50) which is at or below 3 μm. This particle diameter can substantially uniformly distribute the $Zro_2$ particle over the thick-film resistor.

To achieve the second object, the invention provides a ceramic circuit board comprising a thick-film resistor and/or a thick-film conductor each formed on a ceramic substrate, the thick-film resistor containing $RuO_2$ having a surface to which $K_2O$ of 0.8 to 4 wt % relative to $RuO_2$ of 100 wt % adheres and an $SiO_2$—$B_2O_3$—$K_2O$ glass having a composition of 60 wt %$\leq SiO_2 \leq$85 wt %, 15 wt %$\leq B_2O_3 \leq$40 wt %, and 1 wt %$\leq K_2O \leq$10 wt %, and impurity $\leq$3 wt %, and an overcoat glass covering a surface or surfaces of the thick-film resistor and/or the thick-film conductor and comprising an $SiO_2$—$B_2O_3$—$K_2O$ glass and impurity, the $SiO_2$—$B_2O_3$—$K_2O$ glass having a composition of 60 wt %$\leq SiO_2 \leq$85 wt %, 15 wt %$\leq B_2O_3 \leq$30 wt %, and 1 wt %$\leq K_2O \leq$10 wt %, and a film of the overcoat glass is formed on the thick-film resistor.

The overcoat glass may be fired with the thick-film resistor. However, since the overcoat glass is sometimes printed and fired after the firing of the thick-film resistor, the firing temperature of the overcoat glass is preferably set to be equal to or lower than the firing temperature of the thick-film resistor (for, example, about 850° C.). The transition point of the overcoat glass is preferably at or below 550° C. in order that the overcoat glass may be fired at a temperature lower than 850° C. (for example, in a range between 600 and 700° C.).

The glass transition point of the $SiO_2$—$B_2O_3$—$K_2O$ glass composed as described above is at or below 550° C. Thus, the overcoat glass can be fired at a temperature lower than the firing temperatures of the thick-film resistor and the thick-film conductor. In this case, $K_2O$ contained in the overcoat glass serves to lower the glass transition point. Accordingly, when $K_2O$ is at or below 1 wt %, the glass transition point exceeds 550° C. such that it is difficult to reduce the firing temperature of the overcoat glass.

The thermal expansion coefficient (TEC) of the overcoat glass is increased when a quantity of $K_2O$ contained in the overcoat glass is excessively increased. Accordingly, it is not preferable to unnecessarily increase the quantity of $K_2O$ to be blended into the glass. The thermal expansion coefficient of the overcoat glass is at or below $6.0 \times 10^{-6}$/° C. when the quantity of $K_2O$ is at or below 10 wt % as in the present invention. Accordingly, in a case where this overcoat glass is used on a ceramic substrate having a low thermal expansion coefficient (4 to $6 \times 10^{-6}$/° C.), the difference between the thermal expansion coefficients of the overcoat glass and the ceramic substrate is small than in the prior art both when the coefficient of the overcoat glass is smaller and larger than that of the ceramic substrate. Accordingly, even when the overcoat glass in accordance with the invention is used for the ceramic substrate having a low thermal expansion coefficient, a compressive force or a slight tensile force is applied from the ceramic substrate to the overcoat glass. Thus, the overcoat glass is not subjected to a large tensile force. As a result, the overcoat glass sufficiently serves to limit the progress of microcrack in the thick-film resistor after the laser trimming. Thus, the change in the resistance value after the laser trimming is small and accordingly, the stability in the resistance of the thick-film resistor can be improved.

The present invention may be applied irrespective of types of the thick-film resistors and conductors. A larger effect can be obtained when the thick-film resistor contains $RuO_2$ and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %.

When the used thick-film resistor contains the $SiO_2$—$B_2O_3$—$K_2O$ glass having substantially the same composition as the overcoat glass in accordance with the present invention, the adhesion between the overcoat glass and the thick-film resistor can be Improved, whereupon the protecting effect of the overcoat glass can be improved. Moreover, since the $SiO_2$—$B_2O_3$—$K_2O$ glass is used as the glass contained in the thick-film resistor, the firing temperature and thermal expansion coefficient of the thick-film resistor can be decreased. Consequently, a high quality unleaded thick-film resistor can be fabricated.

Furthermore, the ceramic substrate is preferably fabricated from a glass ceramic fired at 800 to 1000° C. Consequently, since the ceramic substrate, thick-film resistor and overcoat glass can simultaneously be fired in a single firing step, the fabricating efficiency can be improved and the strength of junction of the ceramic substrate and thick-film resistor can be improved.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

First Embodiment:

A thick-film resistor of a first embodiment comprises $RuO_2$ and $SiO_2$—$B_2O_3$—$K_2$ glass as main components and contains no additive such as additive glass or transition metal oxide both of which will be described later. The $SiO_2$—$B_2O_3$—$K_2$ glass used in the embodiment has the following composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %.

The inventors fabricated glasses A to G having compositions shown in TABLE 1 and measured thermal expansion coefficients (TEC) and glass transition points of the glasses A to G, respectively.

Figure 6:
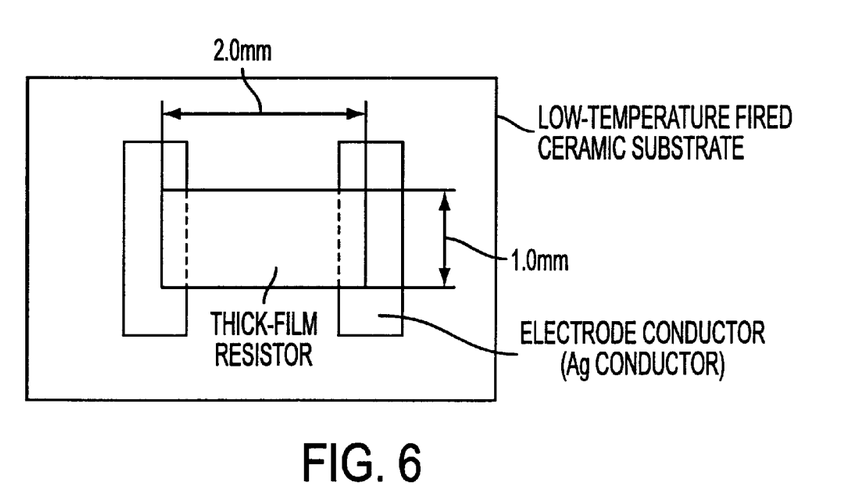
FIG. 6 is a plane view of one sample of the thick-film resistor in accordance with the invention.

Each thick-film resistor sample was formed on a low-temperature fired ceramic substrate of CaO—$Al_2O_3$—$SiO_2$—$B_2O_3$ system as shown in FIG. 6. Each sample had a line width of 1.0 mm and a length of 2.0 mm. Both ends of each thick-film resistor sample were laid on two electrode conductors (Ag conductors) formed on the ceramic substrate respectively. Each thick-film resistor samples of TABLES 3, 4, and 6 to 8 was constructed as shown in FIG. 6

TABLE 2

Characteristics of thick-film resistor containing no additive

| | $RuO_2$ | | | Glass | | |
|---|---|---|---|---|---|---|
| Sample | $K_2O$ (wt %) | BET ($m^2$/g) | Blending amount (wt %) | Type | BET ($m^2$/g) | Blending amount (wt %) |
| 1 | 2.4 | 45 | 7.5 | A | 17.1 | 92.5 |
| 2 | 2.4 | 45 | 7.2 | B | 15.5 | 92.8 |
| 8 | 2.4 | 45 | 7.5 | C | 16.6 | 92.8 |
| 4 | 2.4 | 45 | 7.2 | D | 15.1 | 92.8 |
| 5 | 2.4 | 45 | 6.8 | E | 15.4 | 93.2 |
| 6 | 2.4 | 45 | 7.5 | F | 13.6 | 92.5 |
| 7 | 2.4 | 45 | 7.5 | G | 14.5 | 92.5 |

| Sample | Sheet resistance value (Ω/square) | TCR (× $10^{-6}$/° C.) | ESD (%) | Firing temperature dependency (%/° C.) | Heat cycle after trimming (1000 cycles) (%) |
|---|---|---|---|---|---|
| 1 | 95,000 | −68 | −9.5 | −0.7 | +0.3 |
| 2 | 103,000 | −90 | −9.2 | −0.6 | +0.3 |
| 3 | 108,000 | −92 | −9.1 | −0.7 | +0.3 |
| 4 | 90,000 | −90 | −9.2 | −0.7 | +0.5 |
| 5 | 92,000 | −93 | −9.5 | −0.6 | +0.7 |
| 6 | 97,000 | −98 | −9.3 | −0.6 | +0.3 |
| 7 | 92,000 | −98 | −9.7 | −0.5 | +0.8 |

In each of the thick-film resistor samples 1 to 7, $K_2O$ of 2.4 wt % relative to $RuO_2$ of 100 wt % was adherent to a

TABLE 1

Glass types

| Glass type | $SiO_2$ (wt %) | $B_2O_3$ (wt %) | $K_2O$ (wt %) | $Na_2O$ (wt %) | $Al_2O_3$ (wt %) | MgO (wt %) | CaO (wt %) | ZnO (wt %) | $Li_2O$ (wt %) | TEC (× $10^{-6}$/° C.) | Transition Point (° C.) |
|---|---|---|---|---|---|---|---|---|---|---|---|
| A | 79.7 | 16.9 | 2.3 | 0.0 | 0.9 | 0.0 | 0.0 | 0.0 | 0.0 | 2.8 | 490 |
| B | 77.6 | 16.8 | 4.6 | 0.1 | 0.8 | 0.0 | 0.0 | 0.0 | 0.0 | 2.9 | 485 |
| C | 75.6 | 21.1 | 2.3 | 0.0 | 0.9 | 0.0 | 0.0 | 0.0 | 0.0 | 3.1 | 490 |
| D | 73.5 | 21.1 | 4.4 | 0.1 | 0.8 | 0.0 | 0.0 | 0.0 | 0.0 | 3.6 | 486 |
| E | 75.8 | 18.8 | 6.3 | 0.1 | 1.2 | 0.0 | 0.0 | 0.0 | 0.0 | 4.2 | 492 |
| F | 69.8 | 27.3 | 1.8 | 0.2 | 0.8 | 0.0 | 0.5 | 0.0 | 0.0 | 3.2 | 500 |
| G | 72.6 | 15.8 | 10.0 | 0.0 | 1.3 | 0.1 | 0.2 | 0.0 | 0.0 | 5.5 | 484 |

Each of the glasses A to G has the following composition of 69.6 wt %$\leq SiO_2 \leq$79.7 wt %, 15.8 wt %$\leq B_2O_3 \leq$27.3 wt %, and 1.8 wt %$\leq K_2O \leq$10.0 wt %. Each glass has a thermal expansion coefficient (TEC) of 2.8 to 5.5×$10^{-6}$/° C. and a glass transition point of 484 to 500° C.

The inventors blended $RuO_2$ with the glasses A to G of TABLE 1 to fabricate samples of seven types of thick-film resistors as shown in TABLE 2, respectively. The inventors measured a sheet resistance value, temperature coefficient of resistance (TCR) change rate of resistance value by way of ESD, and firing temperature dependency of each sample. TABLE 2 shows the results of measurement.

surface of $RuO_2$. $RuO_2$ had a specific surface area (BET) of 45 $m^2$/g and glass had a specific surface area (BET) of 13.6 to 17.1 $m^2$/g. Each sample had a sheet resistance value of 90 to 108 kΩ/square and a temperature coefficient of resistance (TCR) of −68 to −98×$10^{-6}$/° C. A change rate of each sample ranged between −9.1 and −9.7% and a firing temperature dependency of each sample ranged between −0.5 and −0.7%/° C. TCR, the change rate and the firing temperature dependency of each sample were within respective preferably ranges.

The change rate of resistance value by way of ESD was measured by application of 5 pulses each of which has a voltage of 2 kV. The firing temperature dependency was a change rate (%/° C.) of resistance value relative to change in a firing temperature. For example, the sheet resistance value is 100 kΩ/square when each sample is fired at 850° C. The sheet resistance value is 93 kΩ/square when each sample is fired at 840° C. In this case, the firing temperature dependency is obtained by calculation as follows:

Firing temperature dependency=(100−93)/(850−840)=0.7%/° C.

A test was then conducted for evaluation of a preferable range of the specific surface area of $RuO_2$. TABLE 3 shows the results of the test.

TABLE 3

Evaluation of specific surface area of $RuO_2$

| Sample | $RuO_2$ | | | Glass | | |
|---|---|---|---|---|---|---|
| | $K_2O$ (wt %) | BET ($m^2$/g) | Blending amount (wt %) | Type | BET ($m^2$/g) | Blending amount (wt %) |
| 8 | 2.4 | 22 | 7 | A | 17.1 | 93 |
| 9 | 2.4 | 33 | 7 | A | 17.1 | 93 |
| 10 | 2.4 | 45 | 7 | A | 17.1 | 93 |
| 11 | 2.4 | 76 | 7 | A | 17.1 | 93 |

| Sample | Sheet resistance value (Ω/square) | TCR (× $10^{-6}$/° C.) | ESD (%) | Firing temperature dependency (%/° C.) | Heat cycle after trimming (1000 cycles) (%) |
|---|---|---|---|---|---|
| 8 | 212,000 | −68 | −25.6 | −0.9 | +0.3 |
| 9 | 221,000 | −70 | −18.7 | −0.9 | +0.6 |
| 10 | 227,000 | −75 | −15.8 | −0.9 | +0.4 |
| 11 | 233,000 | −65 | −11 | −0.8 | +0.2 |

Figure 1:
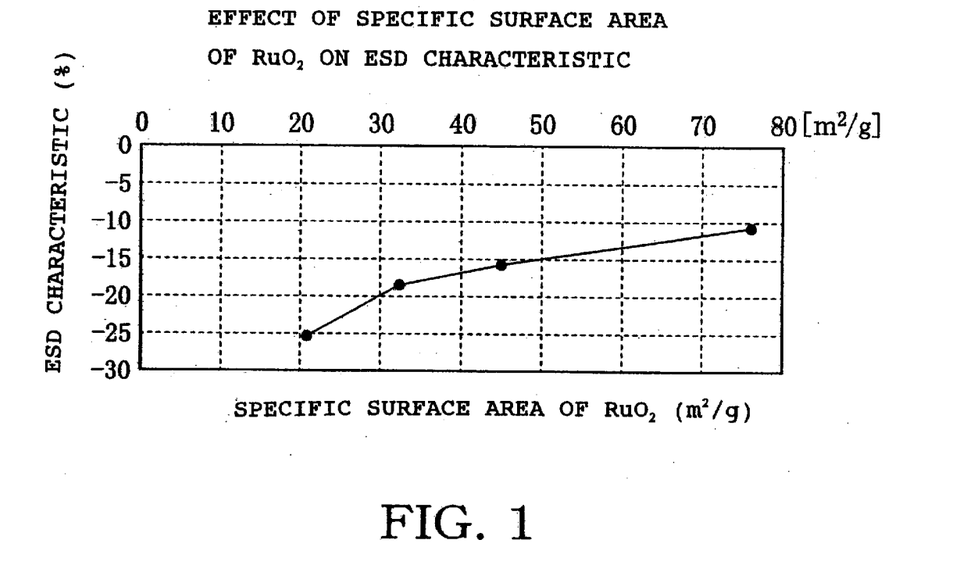
FIG. 1 is a graph showing the data obtained from measurement of the relationship between the specific surface area of $RuO_2$ and the ESD characteristic thereof.

Regarding each of samples 8 to 11, only the specific surface area (BET) of $RuO_2$ was changed with the other conditions being the same. FIG. 1 shows the relationship between the specific surface area (BET) of $RuO_2$ and the change rate of resistance value by way of ESD both measured in the test.

As obvious from TABLE 3, each of the temperature coefficient of resistance (TCR) and the firing temperature dependency has a small change even when the specific surface area (BET) of $RuO_2$ is changed. However, an electric charge tends to be concentrated more as a specific surface area of $RuO_2$ is rendered small, whereupon an electro-static discharge (ESD) characteristic tends to be reduced. Generally, the change rate of resistance value by way of ESD is preferably smaller than −10%. Accordingly, the specific surface area (BET) of $RuO_2$ is preferably at or above 30 $m^2$/g. See FIG. 1. However, when the specific surface area (BET) exceeds 80 $m^2$/g, an oxidation catalytic action of $RuO_2$ is intensified such that there is a possibility of spontaneous fire of organic substance. Accordingly, the specific surface area (BET) of $RuO_2$ is preferably at or below 80 $m^2$/g.

Figure 2:
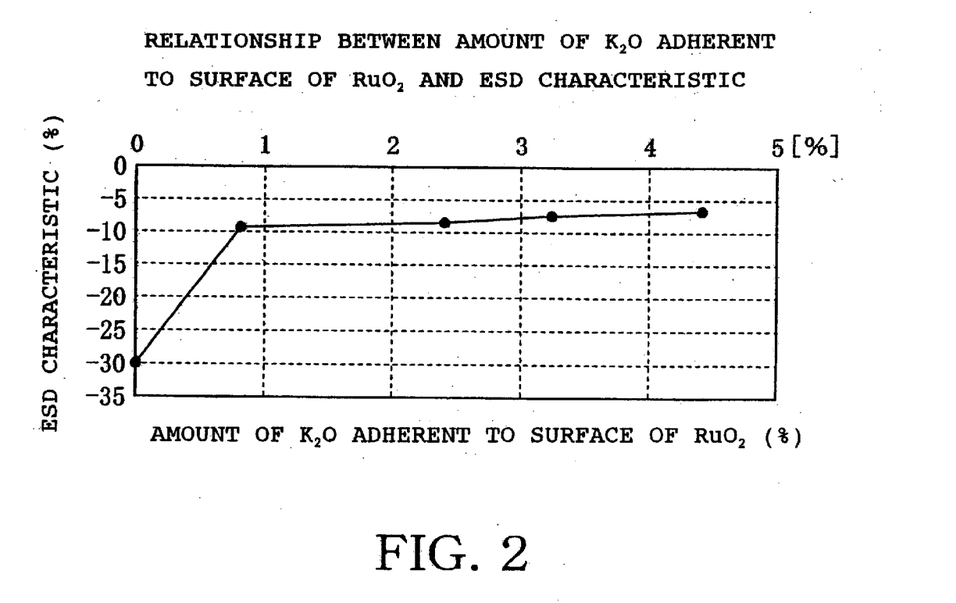
FIG. 2 is a graph showing the data obtained from measurement of an amount of $K_2O$ adherent to the surface of $RuO_2$ and the ESD characteristic thereof.
Figure 3:
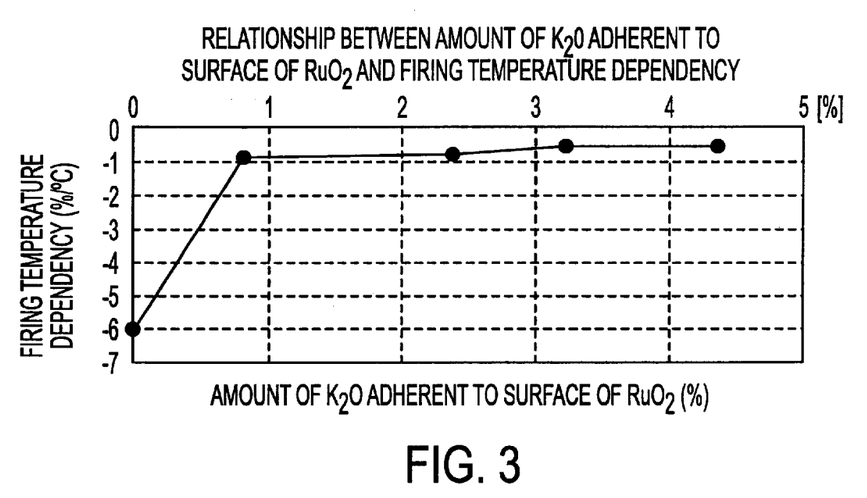
FIG. 3 is a graph showing the data obtained from measurement of an amount of $K_2O$ adherent to the surface of $RuO_2$ and the firing temperature dependency.

Another test was conducted for evaluation of a preferable range of an amount of $K_2O$ adherent to the surface of $RuO_2$. TABLE 4 shows the results of test. FIGS. 2 and 3 also show the test results.

TABLE 4

Evaluation of amount of $K_2O$ adherent to $RuO_2$ surface

| Sample | $RuO_2$ | | | Glass | | |
|---|---|---|---|---|---|---|
| | $K_2O$ (wt %) | BET ($m^2$/g) | Blending amount (wt %) | Type | BET ($m^2$/g) | Blending amount (wt %) |
| 12 | 0 | 31 | 15.5 | A | 17.1 | 84.5 |
| 13 | 0.6 | 33 | 11 | A | 17.1 | 89 |
| 14 | 2.4 | 33 | 7.5 | A | 17.1 | 92.5 |
| 15 | 3.2 | 32 | 7.5 | A | 17.1 | 92.5 |
| 16 | 4.4 | 33 | 7.5 | A | 17.1 | 92.5 |

| Sample | Sheet resistance value (Ω/square) | TCR (× $10^{-6}$/° C.) | ESD (%) | Firing temperature dependency (%/° C.) | Heat cycle after trimming (1000 cycles) (%) |
|---|---|---|---|---|---|
| 12 | 96,000 | 360 | −30 | −6 | +0.6 |
| 13 | 97,000 | 70 | −9.5 | −0.87 | +0.4 |
| 14 | 98,000 | 3 | −8.5 | −0.71 | +0.3 |
| 15 | 102,000 | −50 | −7.5 | 0.51 | +0.3 |
| 16 | 95,000 | −190 | −7 | −0.55 | +0.3 |

$K_2O$ on the surface of $RuO_2$ improves wettability between the $SiO_2$—$B_2O_3$—$K_2O$ glass and $RuO_2$ and accordingly stabilizes the conduction through glass, so that changes in the resistance value due to the changes of the firing temperature or the firing temperature dependency can be reduced. $K_2O$ on the surface of $RuO_2$ further prevents the concentration of electric charge, improving the ESD characteristic.

Concerning sample 12, since $K_2O$ is not adherent to the surface of $RuO_2$ concentration of electric charge tends to occur and the change rate of resistance by way of ESD becomes excessively large to be out of a preferable range. Moreover, when $K_2O$ is not adherent to the surface of $RuO_2$ the wettability between the $SiO_2$—$B_2O_3$—$K_2O$ glass and $RuO_2$ is reduced and the conduction through the glass is not stabilized. As a result, the temperature coefficient of resistance by way of changes in the firing temperature (firing temperature dependency) becomes excessively large to be out of a preferable range. The firing temperature dependency is preferably smaller than −1%/° C.

On the other hand, the change rate of resistance value and the firing temperature dependency are within respective preferable ranges when 0.8 wt % or more $K_2O$ relative to 100 wt % $RuO_2$ is adherent to the surface of $RuO_2$ (samples 13 to 16). The reason for this is that $K_2O$ on the surface of $RuO_2$ improves wettability between the $SiO_2$—$B_2O_3$—$K_2O$ glass and $RuO_2$ and accordingly stabilizes the conduction through glass, so that changes in the resistance value due to the changes of the firing temperature or the firing temperature dependency can be reduced. $K_2O$ on the surface of $RuO_2$ further prevents the concentration of electric charge, improving the ESD characteristic.

In sample 16, an amount of $K_2O$ adherent to the surface of $RuO_2$ is 4.4 wt %. In this case, the amount of $K_2O$ is excessively large such that the resistance of glass by conduction Is reduced and the temperature coefficient of resistance (TCR) changes to a large extent to thereby take a negative value. Accordingly, an amount of $K_2O$ adherent to the surface of $RuO_2$ preferably ranges between 0.8 and 4 wt %.

The thermal expansion coefficient of glass is 2.8 to 5.5×10$^{-6}$/° C. as shown in TABLE 1 Accordingly, since the thermal expansion coefficient of the thick-film resistor is at or below 60×10$^{-6}$/° C., the change in the resistance value after the trimming is small even without provision of overcoat glass. Further, since $K_2O$ is adherent to the surface of $RuO_2$, the wettability between the $SiO_2$—$B_2O_3$—$K_2O$ glass and $RuO_2$ is good and the thick-film resistor is less susceptible to variations in the firing step. Consequently, a high resistor of 100 kΩ/square or above can stably be fabricated and PbO need not be contained.

Further, since no overcoat is required, a resistance value measuring probe used in the trimming is not soiled by the glass. Consequently, the resistance value can accurately be measured and the trimming accuracy can be improved.

Second Embodiment:

The thick-film resistor of a second embodiment comprises a mixture of $RuO_2$ and $SiO_2$—$B_2O_3$—$K_2$ glass and contains additive glass containing a transition metal oxide and $B_2O_3$ or a transition metal oxide of 5 wt % or below. The used transition metal oxide includes oxides such as Zn, Fe, Co, Mn, Cu, Ta, Cr, Ti, etc.

The inventors made additive glasses 101 to 104 having the respective compositions as shown in the following TABLE 5 and further fabricated samples 21 to 38 using the additive glasses, as shown in TABLE 6. The inventors measured a sheet resistance value, temperature coefficient of resistance (TCR), change rate of resistance value by way of ESD, and firing temperature dependency of each sample. TABLE 6 shows the results of measurement.

TABLE 5

Additive glass types

| Additive Glass | $SiO_2$ (wt %) | $B_2O_3$ (wt %) | $K_2O$ (wt %) | $Na_2O$ (wt %) | $Al_2O_3$ (wt %) | $Fe_2O_3$ (wt %) |
| --- | --- | --- | --- | --- | --- | --- |
| 101 | 6.2 | 28.4 | 0 | 0 | 0 | 0 |
| 102 | 0 | 33.2 | 0 | 0 | 0.4 | 0 |
| 103 | 5 | 30 | 0 | 0 | 0 | 0 |
| 104 | 15 | 35 | 0 | 0 | 0 | 0 |

| Additive Glass | CuO (wt %) | ZnO (wt %) | $Ta_2O_5$ (wt %) | $MnO_2$ (wt %) | TEC (× 10$^{-6}$/° C.) | Transition Point (° C.) |
| --- | --- | --- | --- | --- | --- | --- |
| 101 | 0 | 57.3 | 4.5 | 0 | | |
| 102 | 0 | 65.4 | 0 | 0 | 4.16 | 568 |
| 103 | 0 | 65 | 0 | 0 | | |
| 104 | 50 | 0 | 0 | 0 | | |

TABLE 6

Characteristics of thick-film resistor containing additive

| | $RuO_2$ | | | Glass | | | Transition metal oxide | |
| --- | --- | --- | --- | --- | --- | --- | --- | --- |
| Sample | $K_2O$ (wt %) | BET (m$^2$/g) | Blending amount (wt %) | Type | BET (m$^2$/g) | Blending amount (wt %) | Type | Blending amount (wt %) |
| 21 | 2.4 | 45 | 7 | A | 17.5 | 93 | | 0 |
| 22 | 2.4 | 45 | 8 | A | 17.5 | 92 | | 0 |
| 23 | 2.4 | 45 | 7 | A | 17.5 | 93 | | 0 |
| 24 | 2.4 | 45 | 8 | A | 17.5 | 92 | | 0 |
| 25 | 2.4 | 45 | 7 | A | 17.5 | 93 | | 0 |
| 26 | 2.4 | 45 | 8 | A | 17.5 | 92 | | 0 |
| 27 | 2.4 | 45 | 7 | A | 17.5 | 93 | | 0 |
| 28 | 2.4 | 45 | 8 | A | 17.5 | 92 | | 0 |
| 29 | 2.4 | 45 | 7 | A | 17.5 | 93 | CuO | 1 |
| 30 | 2.4 | 45 | 8 | A | 17.5 | 92 | CuO | 1 |
| 31 | 2.4 | 45 | 6 | A | 17.5 | 94 | CuO | 2 |
| 32 | 2.4 | 45 | 7 | A | 17.5 | 93 | CuO | 2 |
| 33 | 2.4 | 45 | 7 | A | 17.5 | 93 | CuO | 2 |
| 34 | 2.4 | 45 | 7 | A | 17.5 | 93 | $Cu_2O$ | 2 |
| 35 | 2.4 | 45 | 7 | A | 17.5 | 93 | 104 | 4 |
| 36 | 3.2 | 32 | 8 | B | 15.5 | 92 | 104 | 4 |
| 37 | 0.8 | 33 | 11 | D | 15.1 | 89 | 104 | 1 |
| 38 | 4.4 | 33 | 6 | A | 17.1 | 94 | CuO | 3 |

| | Additive glass | | Sheet resistance value (Ω/square) | TCR (× 10$^{-6}$/° C.) | ESD (%) | Firing temperature dependency (%/° C.) | Heat cycle after trimming (1000 cycles) (%) |
| --- | --- | --- | --- | --- | --- | --- | --- |
| Sample | Type | Blending amount (wt %) | | | | | |
| 21 | 103 | 1 | 256,000 | 103 | −150 | −9.8 | +0.5 |
| 22 | 103 | 1 | 25,000 | 10 | 72 | −2.2 | +0.4 |
| 23 | 103 | 2 | 290,000 | −240 | −7.2 | −0.7 | +0.3 |
| 24 | 103 | 2 | 31,000 | −3 | −1.7 | −0.7 | +0.3 |
| 25 | 103 | 5 | 380,000 | −330 | −2.4 | −0.8 | +0.4 |
| 26 | 103 | 5 | 48,000 | −29 | −0.8 | −0.8 | +0.5 |
| 27 | 103 | 10 | 420,000 | −380 | −1.3 | −0.8 | +0.3 |
| 28 | 103 | 10 | 61,000 | −40 | −1.1 | −0.7 | +0.4 |
| 29 | 103 | 5 | 240,000 | −170 | −4.3 | −0.8 | +0.3 |

TABLE 6-continued

Characteristics of thick-film resistor containing additive

| 30 | 103 | 5  | 35,000  | 21   | −1.5 | −0.8 | +0.3 |
| 31 | 103 | 5  | 180,000 | −98  | −9.5 | −0.8 | +0.4 |
| 32 | 103 | 5  | 510,000 | 69   | −6.6 | −0.8 | +0.3 |
| 33 | 101 | 5  | 170,000 | −87  | −9.1 | −0.8 | +0.2 |
| 34 | 102 | 5  | 174,000 | −93  | −9.3 | −0.7 | +0.4 |
| 35 | 103 | 5  | 186,000 | −95  | −9.2 | −0.7 | +0.3 |
| 36 | 103 | 5  | 97,000  | −8   | −2.4 | −0.6 | +0.4 |
| 37 | 102 | 7  | 105,000 | −18  | −3.3 | −0.7 | +0.4 |
| 38 | 103 | 10 | 133,000 | −145 | −8.8 | −0.8 | +0.4 |

Each of additive glasses 101 to 104 contains 28.4 to 35 wt % $B_2O_3$ and 50 to 65.4 wt % ZnO or CuO serving as the transition metal oxide. In each of samples 21 to 38, 0.8 to 4.4 wt % $K_2O$ relative to 100 wt % $RuO_2$ is adherent to the surface of $RuO_2$. $RuO_2$ has a specific surface area (BET) of 32 to 45 m²/g and glass has a specific surface area (BET) of 15.1 to 17.5 m²/g.

1 to 3 wt % CuO or $Cu_2O$ serving as the transition metal oxide is added to each of samples 29 to 34 and 38. An amount of additive glass contained in each of samples 21 to 38 is 1 to 10 wt %. Additive glass 104 containing CuO is added to each of samples 35 to 37 instead of the transition metal oxide. Accordingly, two types of additive glasses are added to each of samples 35 to 37.

The inventors conducted a test to evaluate the effect of the additive glass. TABLE 7 shows the results of test.

Borate containing the transition metal (Zn) in the additive glass 103 has conductivity by electronic conduction and accordingly a semiconductive property. Accordingly, the additive glass 103 prevents local concentration of electric charge when a surge voltage is applied thereto, thereby preventing breaking of the glass of the thick-film resistor. This characteristic increases the effect of adding the additive glass 103 when a sheet resistance value is large.

Figure 4:
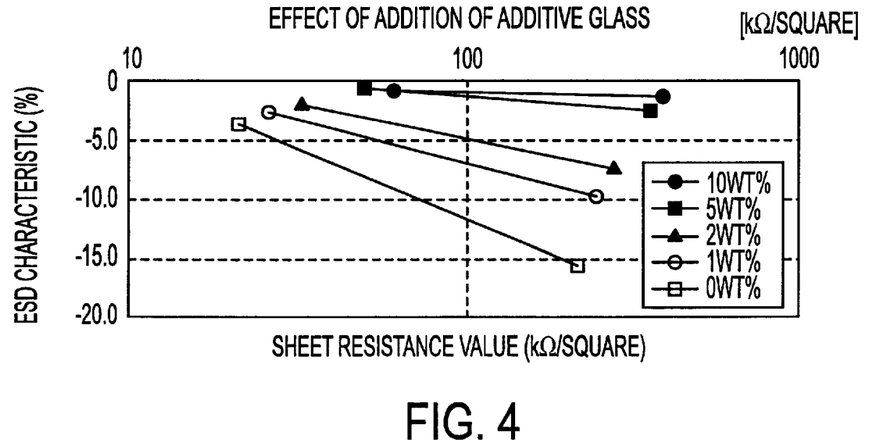
FIG. 4 is a graph showing the data obtained from measurement of effect of addition of the additive glass.

FIG. 4 shows the relationship among an amount of additive glass 103, the resistance value change rate by ESD, and the sheet resistance value obtained from the data of TABLE 7. As obvious from FIG. 4, a good ESD characteristic can be ensured without addition of additive glass 103 when the sheet resistance value is smaller than 100 kΩ/square. However, when the sheet resistance value is larger than 100 kΩ/square, the ESD characteristic is dete-

TABLE 7

Evaluation of addition of additive glass

| | RuO₂ | | | Glass | | | Transition metal oxide | |
| --- | --- | --- | --- | --- | --- | --- | --- | --- |
| Sample | K₂O (wt %) | BET (m²/g) | Blending amount (wt %) | Type | BET (m²/g) | Blending amount (wt %) | Type | Blending amount (wt %) |
| 41 | 2.4 | 45 | 7 | A | 17.1 | 93 |     | 0  |
| 42 | 2.4 | 45 | 8 | A | 17.1 | 92 |     | 0  |
| 43 | 2.4 | 45 | 7 | A | 17.5 | 93 | 103 | 1  |
| 44 | 2.4 | 45 | 8 | A | 17.5 | 92 | 103 | 1  |
| 45 | 2.4 | 45 | 7 | A | 17.5 | 93 | 103 | 2  |
| 46 | 2.4 | 45 | 8 | A | 17.5 | 92 | 103 | 2  |
| 47 | 2.4 | 45 | 7 | A | 17.5 | 93 | 103 | 5  |
| 48 | 2.4 | 45 | 8 | A | 17.5 | 92 | 103 | 5  |
| 49 | 2.4 | 45 | 7 | A | 17.0 | 93 | 103 | 10 |
| 50 | 2.4 | 45 | 8 | A | 17.5 | 92 | 103 | 10 |

| Sample | Sheet resistance value (Ω/square) | TCR (× 10⁻⁶/° C.) | ESD (%) | Firing temperature dependency (%/° C.) | Heat cycle after trimming (1000 cycles) (%) |
| --- | --- | --- | --- | --- | --- |
| 41 | 227,000 | −75   | −15.8 | −0.9 | +0.3 |
| 42 | 19,000  | 147   | −3.6  | −0.6 | +0.3 |
| 43 | 256,000 | −150  | −9.8  | −0.7 | +0.3 |
| 44 | 25,000  | 72    | −2.2  | −0.7 | +0.3 |
| 45 | 290,000 | −240  | −7.2  | −0.7 | +0.4 |
| 46 | 31,000  | −3    | −1.7  | −0.7 | +0.4 |
| 47 | 380,000 | −330  | −2.4  | −0.8 | +0.5 |
| 48 | 48,000  | −29   | −0.8  | −0.8 | +0.6 |
| 49 | 420,000 | −380  | −1.3  | −0.8 | +0.6 |
| 50 | 61,000  | −40   | −1.1  | −0.7 | +0.7 | riorated when additive glass 103 is not added. The ESD characteristic is improved better with increase in the amount of additive glass 103. Consequently, when the sheet resistance value is larger than 100 kΩ/square, the ESD characteristic can effectively be improved by addition of a suitable amount of additive glass.

TABLE 8

Evaluation of effect of addition of CuO

| | RuO$_2$ | | | Glass | | | Transition metal oxide | |
|---|---|---|---|---|---|---|---|---|
| Sample | K$_2$O (wt %) | BET (m$^2$/g) | Blending amount (wt %) | Type | BET (m$^2$/g) | Blending amount (wt %) | Type | Blending amount (wt %) |
| 51 | 2.4 | 45 | 7 | A | 17.5 | 93 | | 0 |
| 52 | 2.4 | 45 | 8 | A | 17.5 | 92 | | 0 |
| 53 | 2.4 | 45 | 7 | A | 17.5 | 93 | CuO | 1 |
| 54 | 2.4 | 45 | 8 | A | 17.5 | 92 | CuO | 1 |
| 55 | 2.4 | 45 | 6 | A | 17.5 | 94 | CuO | 2 |
| 56 | 2.4 | 45 | 7 | A | 17.5 | 93 | CuO | 2.5 |

Evaluation of effect of addition of CuO

| | Additive glass | | Sheet resistance value (Ω/square) | TCR (×10$^{-6}$/° C.) | ESD (%) | Firing temperature dependency (%/° C.) | Heat cycle after trimming (1000 cycles) (%) |
|---|---|---|---|---|---|---|---|
| Sample | Type | Blending amount (wt %) | | | | | |
| 51 | 103 | 5 | 380,000 | −330 | −2.4 | −0.8 | +0.3 |
| 52 | 103 | 5 | 48,000 | −29 | −0.8 | −0.8 | +0.3 |
| 53 | 103 | 5 | 240,000 | −170 | −4.3 | −0.8 | +0.3 |
| 54 | 103 | 5 | 35,000 | 21 | −1.5 | −0.8 | +0.4 |
| 55 | 103 | 5 | 180,000 | −98 | −9.5 | −0.8 | +0.4 |
| 56 | 103 | 5 | 510,000 | −69 | −6.6 | −0.9 | +0.5 |

Figure 5:
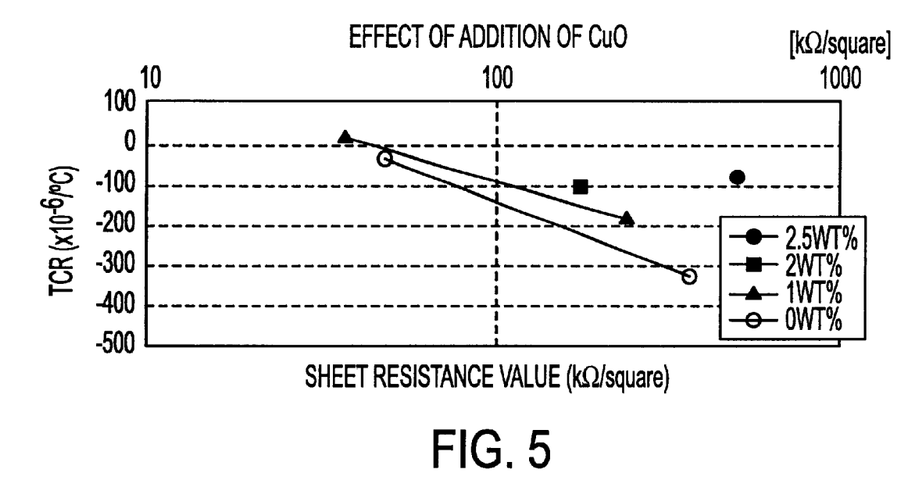
FIG. 5 is a graph showing the data obtained from measurement of effect of addition of CuO.

FIG. 5 shows the relationship among an amount of CuO added, the temperature coefficient of resistance (TCR), and the sheet resistance value obtained from the data of TABLE 8. As obvious from FIG. 5, the temperature coefficient of resistance (TCR) is small without addition of CuO when the sheet resistance value is smaller than 100 kΩ/square. However, when the sheet resistance value is larger than 100 kΩ/square, the temperature coefficient of resistance (TCR) is increased when CuO is not added. The temperature coefficient of resistance (TCR) becomes smaller with increase in an amount of CuO added. Accordingly, when the sheet resistance value is larger than 100 kΩ/square, the temperature coefficient of resistance (TCR) can effectively be improved by addition of a suitable amount of CuO. However, when the amount of CuO added exceeds 5 wt %, there is a possibility that the resistance value may not be stable. Thus, the amount of CuO added is preferably 5 wt % or below. The other effect in the second embodiment is the same as that in the first embodiment.

Third Embodiment:

The thick-film resistor self-heats when electric current flows therethrough, so that the temperature thereof is increased. The thick-film resistor varies its resistance value with changes in the temperature thereof. Accordingly, an amount of change in the resistance value of the thick-film resistor is rendered larger as an amount of increase in the temperature due to generation of heat becomes large, whereupon stable electric characteristics cannot be obtained. Further, when the temperature of the thick-film resistor is increased over the critical heat resistance, crack occurs in the thick-film resistor. In view of both electrical characteristics and heat resistance, it is desired that the heat radiation characteristic be increased so that an increase in the temperature due to heat generation is rendered as small as possible.

However, glass used in the thick-film resistor has a small heat conductivity for improvement of the electrical characteristics such as the temperature coefficient of resistance (TCR). ESD, etc. As a result, the heat conductivity and heat radiation of the thick-film resistor are deteriorated. Accordingly, in order that the increase in the temperature due to heat generation may be limited within an allowable range, the maximum power supplied to the thick-film resistor needs to be reduced so that an amount of heat generated by the thick-film resistor is reduced and accordingly, the power resistance (heat resistance) is lowered. Particularly when the thick-film resistor is fabricated on a glass ceramic substrate having a small heat conductivity, the heat radiation of the thick-film resistor is further reduced and the power resistance is further lowered.

In a third embodiment, an SiO$_2$—B$_2$O$_3$—K$_2$O glass contains ZrO$_2$ particle in view of the above-described problem, whereupon the power resistance is improved. The ZrO$_2$ particle has a higher heat conductivity than glass, and the ZrO$_2$ particle and the SiO$_2$—B$_2$O$_3$—K$_2$O glass do not act on each other at the firing temperature of the thick-film resistor (at or below 900° C.). Consequently, when a suitable quantity of ZrO$_2$ is added to the SiO$_2$—B$_2$O$_3$—K$_2$O glass, the thermal conductivity of the thick-film resistor can be increased without deterioration of the electrical characteristics of the thick-film resistors. This can increase heat radiation and improve the power resistance.

For the purpose of evaluating the effect of addition of $ZrO_2$ particle to the thick-film resistor, the inventors fabricated a number of samples of thick-film resistors to conduct a power resistance evaluation test for evaluating the relationship among an amount of $ZrO_2$ particle added, sheet resistance value, and allowable maximum power. TABLE 9 shows the results of test.

TABLE 9

Evaluation of effect of addition of $ZrO_2$

| Sample | RuO2 (wt %) | Glass Type | Glass Blending amount (wt %) | Amount of $ZrO_2$ added (wt %) | Sheet resistance value (Ω/square) | Allowable maximum power (W) |
|---|---|---|---|---|---|---|
| 61 | 8 | A | 92 | 0 | 82,000 | 0.1 |
| 62 | 8 | A | 91 | 1 | 81,000 | 0.2 |
| 63 | 8 | A | 87 | 5 | 84,000 | 0.4 |
| 64 | 8 | A | 82 | 10 | 85,000 | 0.5 |
| 65 | 8 | A | 72 | 20 | 85,000 | 0.5 |
| 66 | 11 | A | 89 | 0 | 11,000 | 1.0 |
| 67 | 11 | A | 79 | 10 | 11,500 | 2.5 |
| 68 | 26 | A | 74 | 0 | 950 | 0.9 |
| 69 | 26 | A | 64 | 10 | 1,050 | 2.1 |
| 70 | 36 | A | 64 | 0 | 105 | 0.9 |
| 71 | 36 | A | 54 | 10 | 115 | 2.1 |
| 72 | 57 | A | 43 | 0 | 11 | 0.8 |
| 73 | 57 | A | 33 | 10 | 11 | 2.2 |
| 74 | 8 | B | 92 | 0 | 97,000 | 0.2 |
| 75 | 8 | B | 82 | 10 | 99,000 | 0.6 |
| 76 | 8 | C | 92 | 0 | 92,000 | 0.1 |
| 77 | 8 | C | 82 | 10 | 95,000 | 0.5 |
| 78 | 8 | D | 92 | 0 | 77,000 | 0.2 |
| 79 | 8 | D | 82 | 10 | 79,000 | 0.5 |
| 80 | 8 | E | 92 | 0 | 75,000 | 0.1 |
| 81 | 8 | E | 82 | 10 | 76,000 | 0.5 |
| 82 | 8 | F | 92 | 0 | 83,000 | 0.2 |
| 83 | 8 | F | 82 | 10 | 84,000 | 0.5 |

Regarding each of thick-film resistor samples 61 to 83, each thick-film resistor was printed on a glass ceramic substrate in the form of a square of 1 mm×1 mm to be fired. A low-temperature fired ceramic substrate was used as the glass ceramic substrate and comprised a mixture of a 60 wt % $CaO-SiO_2-Al_2O_3-B_2O_3$ glass and 40 wt % alumina. TABLE 1 shows the composition of each of glasses A to F blended in the respective thick-film resistor. The $ZrO_2$ particle has a mean particle diameter (D50) which is at or below 3 µm. The mean particle diameter (D50) is a particle diameter of 50% accumulation from the fine particle side in a particle size distribution.

In the power resistance evaluation test, voltage was applied to each of thick-film resistor samples 61 to 83 for five seconds, and a maximum voltage at which a change rate of resistance value of the thick-film resistor was at or below 0.1% was determined to be an allowable maximum voltage. An allowable maximum power was obtained from the following equation on the basis of the allowable maximum voltage and resistance value of the thick-film resistor:

Allowable maximum power=$V_{max}^2/R$ where Vmax is an allowable maximum voltage and R is a resistance value.

As shown in TABLE 9, even when any one of glasses A to F was used as the glass for the thick-film resistor, the allowable maximum power showed a remarkable increase in each sample with addition of $ZrO_2$ particle as compared with each sample without addition of $ZrO_2$ particle.

Further, as obvious from samples 61 to 65 in each of which glass A was used, the allowable maximum power is increased more with an increase in the amount of $ZrO_2$ particle added when an amount of $ZrO_2$ particle added ranges between 1 and 10 wt %. The allowable maximum power has little change when the amount of $ZrO_2$ particle added ranges between 10 and 20 wt %. Accordingly, an upper limit of the amount of $ZrO_2$ particle added should be about 20 wt %. Further, when the amount of $ZrO_2$ particle added is smaller than 1 wt %, improvements in the heat conductivity and the power resistance are small. Consequently, a proper range of the amount of the $ZrO_2$ particle to be added is between 1 and 20 wt %. When the amount of $ZrO_2$ particle is within this range, a change in the sheet resistance value is small and the electrical characteristics do not change so much, whereupon the allowable maximum power can be increased.

Further, the experimental results show that when the mean particle diameter (D50) of the $ZrO_2$ particle is larger than 3 µm, it is difficult to uniformly distribute the $ZrO_2$ particle over the thick-film resistor, and local heat generation occurs in a portion of the thick-film resistor wherein a quantity of the $ZrO_2$ particle is small, whereupon the effect of addition of the $ZrO_2$ particle is reduced. On the other hand, when the mean particle diameter of the $Zi_2$ particle (D50) is at or below 3 µm, the $ZrO_2$ particle can be distributed substantially uniformly over the thick-film resistor, whereupon the effect of addition of the $ZrO_2$ particle can be increased.

Although the thick-film resistor is printed on the glass ceramic substrate to be fired in the foregoing embodiments, it may be printed on another type of ceramic substrate such as alumina substrate to be fired. The glass ceramic substrate is sometimes referred to as "low-temperature fired ceramic substrate."

Fourth Embodiment:

The structure of the ceramic circuit board of a fourth embodiment will be described with reference to FIG. 7. The ceramic substrate 11 may be a glass ceramic substrate fired at 800 to 1000° C., an alumina substrate fired at about 1600° C., or an AIN substrate. The substrate 11 may be a multilayer substrate or a monolayer substrate. When a glass ceramic substrate is used, it may be formed from a blend of 50 to 65 wt % (preferably 60 wt %) $CaO-Al_2O_3-SiO_2-B_2O_3$ glass powder and 50 to 35 wt % (preferably 40 wt %) $Al_2O_3$ powder, a blend of $MgO-Al_2O_3-SiO_2-B_2O_3$ glass powder and $Al_2O_3$ powder, a blend of $SiO_2-B_2O_3$ glass powder and $Al_2O_3$ powder, all of which can be fired at 800 to 1000° C.

A thick-film conductor such as an electrode pattern 13 for connection of a thick-film resistor 12 and a wiring pattern is printed and fired on the surface of the ceramic substrate 11. The thick-film conductor such as the electrode pattern 13 is formed by printing and firing a paste of metal having a low melting point, for example, an Ag conductor such as Ag, Ag/Pd, Ag/Pt, an Au conductor or a Cu conductor. The thick-film conductor may be printed and fired after the firing of the ceramic substrate 11. However, the thick-film conductor may be fired simultaneously with the ceramic substrate 11 when the latter is a glass ceramic substrate.

A thick-film resistor 12 is printed and fired on the surface of the ceramic substrate 11 so as to spread over the electrode patterns 13. The thick-film resistor 12 comprises $RuO_2$ and an $SiO_2$—$B_2O_3$—$K_2O$ glass as main components. The $SiO_2$—$B_2O_3$—$K_2O$ glass has a composition of 60 wt %≦$SiO_2$≦85 wt %, 15 wt %≦$B_2O_3$≦40 wt %, 0.1 wt %≦$K_2O$≦10 wt %, and impurity ≦3wt %. The thick-film resistor 12 may be printed and fired after the printing and firing of the thick-film conductor such as the electrode pattern 13. Alternatively, the thick-film resistor 12 may be fired simultaneously with the thick-film conductor.

An overcoat glass 14 is printed and fired on the surfaces of the thick-film resistor 12 and the electrode pattern 13, thereby covering the overall surfaces. The overcoat glass 14 comprises an $SiO_2$—$B_2O_3$—$K_2O$ glass and impurity, and the $SiO_2$—$B_2O_3$—$K_2O$ glass has a composition of 60 wt %≦$SiO_2$≦85 wt %, 15 wt %≦$B_2O_3$≦30 wt %, and 1 wt %≦$K_2O$≦10 wt %. The overcoat glass 14 may be fired simultaneously with the thick-film resistor 12 or may be printed and fired after the printing and firing of the thick-film resistor 12.

Figure 7:
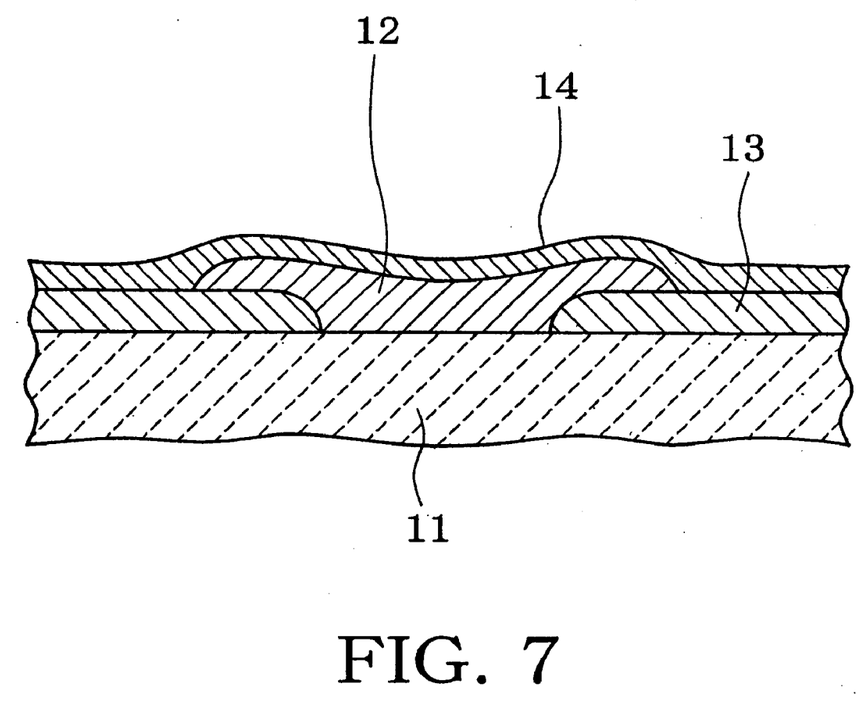
FIG. 7 is a longitudinal section of a major part of the ceramic circuit board of a fourth embodiment in accordance with the invention.

The inventors fabricated ceramic circuit boards each having the structure as shown in FIG. 7 using eight types of overcoat glasses #1 to #8 as shown in the following TABLE 10. The inventors further conducted a test for evaluating stability of resistance in the thick-film resistor 12.

TABLE 10

Composition and thermal expansion coefficient of overcoat glass

| glass type | $SiO_2$ (wt %) | $B_2O_3$ (wt %) | $K_2O$ (wt %) | Impurity (wt %) | Thermal expansion coefficient ($\times 10^{-6}/°$ C.) |
| --- | --- | --- | --- | --- | --- |
| #1 | 79.7 | 16.9 | 2.3 | 0.9 | 2.8 |
| #2 | 77.6 | 16.8 | 4.6 | 0.9 | 2.9 |
| #3 | 75.6 | 21.1 | 2.3 | 0.9 | 3.1 |
| #4 | 73.5 | 21.1 | 4.4 | 0.9 | 3.6 |
| #5 | 75.6 | 16.8 | 6.3 | 1.3 | 4.2 |
| #6 | 69.6 | 27.3 | 1.8 | 1.5 | 3.2 |
| #7 | 81.9 | 15.0 | 2.1 | 1.0 | 3.1 |
| #8 | 72.6 | 15.8 | 10.0 | 1.6 | 5.5 |

A glass ceramic substrate used as the ceramic substrate 11 in the evaluation test comprises 60 wt % CaO—$Al_2O_3$—$SiO_2$—$B_2O_3$ glass and 40 wt % $Al_2O_3$ powder and has a thermal expansion coefficient of $5.0\times10^{-6}/°$ C. An Ag paste is screen-printed on the fired glass ceramic substrate 11 to be formed into the thick-film conductor such as the electrode pattern 13. After the thick-film conductor is dried, the thick-fill resistor 12 is screen-printed on the substrate 11 so as to spread over the electrode pattern 13 and then dried. In this case, the thick-film resistor 12 comprises $RuO_2$ and an $SiO_2$—$B_2O_3$—$K_2O$ glass as main components. An overcoat glass 14 composed as shown in TABLE 10 is screen-printed on the surfaces of the thick-film resistor 12 and electrode pattern 13. The overcoat glass 14 is fired simultaneously with the thick-film resistor 12 and electrode pattern 13 at 850° C., whereby the ceramic circuit board having the structure as shown in FIG. 7 is fabricated.

Each of overcoat glasses #1 to #8 ($SiO_2$—$B_2O_3$—$K_2O$ glass) in TABLE 10 has the composition of 69.6 wt %≦$SiO_2$≦81.9 wt %, 15.0 wt %≦$B_2O_3$≦27.3 wt %, 1.8 wt %≦$K_2O$≦10.0 wt %, and 0.9 wt %≦impurity≦1.5 wt %. Each overcoat glass has a thermal expansion coefficient of 2.8 to $5.5\times10^{-6}/°$ C.

The inventors conducted a migration test and a test for evaluation of stability of the thick-film resistor regarding seven substrate samples fabricated using the overcoat glasses #1 to #8 in TABLE 10. TABLE 11 shows the results of tests.

TABLE 11

| Overcoat glass type | Migration test Insulation resistance (Ω) | Stability of thick-film resistor Resistance change rate (%) |
| --- | --- | --- |
| #1 | >$10^{12}$ | +0.3 |
| #2 | >$10^{12}$ | +0.2 |
| #3 | >$10^{12}$ | +0.3 |
| #4 | >$10^{12}$ | +0.2 |
| #5 | >$10^{12}$ | +0.2 |
| #6 | >$10^{12}$ | +0.2 |
| #7 | >$10^{12}$ | +0.2 |
| #8 | >$10^{12}$ | +0.3 |

In the migration test in TABLE 11, an effect of restraining migration of the Ag conductor wiring formed on each sample by the overcoat glass 14 is evaluated. Each sample was left in an atmosphere with an atmospheric temperature of 85° C. and a humidity of 85% RH for 500 hours while a voltage of 5 V being applied between the Ag conductors covered with the overcoat glass 14 and spaced by 0.15 mm. Thereafter, an insulation resistance between the Ag conductors was measured. Whether a measured insulation resistance value was larger than $10^{12}$ Ω was determined. The migration resistance of the Ag conductor wiring was evaluated on the basis of the above determination. As a result, the measured insulation resistance values between the Ag conductors were larger than $10^{12}$ Ω in all the samples #1 to #8, and it was confirmed that the Ag conductor wiring had a good migration resistance.

In the evaluation of resistance stability of the thick-film resistor, the thick-film resistor 12 formed into a square of 1.0×1.0 mm on each sample was processed by laser trimming and thereafter, a temperature cycle of −55° C. to 150° C. was repeated 500 times so that a resistance change rate of the thick-film resistor 12 was measured. As a result, the resistance change rate of the thick-film resistor 12 was +0.2% to +0.3% in all the samples #1 to #8, and accordingly, it was confirmed that the thick-film resistor 12 had a good resistance stability.

According to the results of tests conducted by the inventors, all the evaluation items of the migration resistance, resistance stability and thermal expansion coefficient satisfy respective required values and a fine unleaded overcoat glass is obtained when the overcoat glass has the composition of 60 wt %≦$SiO_2$≦85 wt %, 15 wt %≦$B_2O_3$≦30 wt %, and 1 wt %≦$K_2O$≦10 wt %. Out of this composition range, the glass transition point is increased such that the overcoat glass cannot be fired at 850° C. or the thermal expansion coefficient becomes equal to or larger than $6.0\times10^{-6}/°$ C. and is accordingly larger than that of the ceramic substrate. Consequently, since the ceramic substrate applies a tensile force to the overcoat glass, the effect of restraining progress of microcrack in the thick-film resistor after the laser trimming is reduced such that the resistance stability is deteriorated.

The present invention may be applied irrespective of types of the thick-film resistors and conductors. When the $RuO_2$ thick-film resistor 12 contains the $SiO_2$—$B_2O_3$—$K_2O$ glass having substantially the same composition as the overcoat glass 14 as in the fourth embodiment, the adhesion between the overcoat glass 14 and the thick-film resistor 12 can be improved, whereupon the protecting effect of the overcoat glass 14 can be improved. Moreover, since the $SiO_2$—$B_2O_3$—$K_2O$ glass is used as the glass contained in the thick-film resistor 12, the firing temperature and thermal expansion coefficient of the thick-film resistor 12 can be decreased. Consequently, a high quality unleaded thick-film resistor can be fabricated.

The foregoing description and drawings are merely illustrative of the principles of the present invention and are not to be construed in a limiting sense. Various changes and modification will become apparent to those of ordinary skill in the art. All such changes and modifications are seen to fall within the scope of the invention as defined by the appended claims

What is claimed is:

1. A thick-film resistor comprising $RuO_2$ having a surface to which $K_2O$ of 0.8 to 4 wt % relative to $RuO_2$ of 100 wt % adheres and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %.

2. The thick-film resistor according to claim 1, wherein $RuO_2$ has a specific surface area ranging between 30 and 80 $m^2g$.

3. The thick-film resistor according to claim 1, further comprising additive glass containing a transition metal oxide and $B_2O_3$.

4. The thick-film resistor according to claim 1, further comprising 5 wt % or less of a transition metal oxide.

5. The thick-film resistor according to claim 1, wherein the $SiO_2$—$B_2O_3$—$K_2O$ glass contains 1 to 20 wt % of $ZrO_2$ particle.

6. The thick-film resistor according to claim 5, wherein the $ZrO_2$ particle has a mean particle diameter (D50) which is at or below 3 $\mu$m.

7. A ceramic circuit board comprising a thick-film resistor printed thereon, the thick-film resistor comprising $RuO_2$ having a surface to which $K_2O$ of 0.8 to 4 wt % relative to $RuO_2$ of 100 wt % adheres and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %.

8. A ceramic circuit board comprising:
a thick-film resistor and/or a thick-film conductor each formed on a ceramic substrate, the thick-film resistor containing $RuO_2$ having a surface to which $K_2O$ of 0.8 to 4 wt % relative to $RuO_2$ of 100 wt % adheres and an $SiO_2$—$B_2O_3$—$K_2O$ glass having a composition of 60 wt %$\leq SiO_2 \leq$85 wt %, 15 wt %$\leq B_2O_3 \leq$40 wt %, 0.1 wt %$\leq K_2O \leq$10 wt %, and impurity $\leq$3 wt %; and
an overcoat glass covering a surface or surfaces of the thick-film resistor and/or the thick-film conductor, the overcoat glass being formed into a film on the thick-film resistor.

9. The ceramic circuit board according to claim 8, wherein the ceramic substrate is fabricated from a glass ceramic fired at 800 to 1000° C.

10. The ceramic circuit board according to claim 8, wherein the overcoat glass comprises an $SiO_2$—$B_2O_3$—$K_2O$ glass and impurity, the $SiO_2$—$B_2O_3$—$K_2O$ glass having a composition of 60 wt %$\leq SiO_2 \leq$85 wt %, 15 wt %$\leq B_2O_3 \leq$30 wt % and 1 wt %$\leq K_2O \leq$10 wt %.

11. The ceramic circuit board according to claim 8, wherein the overcoat glass has a smaller thermal expansion coefficient than the ceramic substrate.

* * * * *